United States Patent [19]
Brahman

[11] 3,787,802
[45] Jan. 22, 1974

[54] AUTOMATIC RANGE SWITCHING FOR DIGITAL DEPTH SOUNDERS

[75] Inventor: Rodman S. Brahman, Berrien Springs, Mich.

[73] Assignee: Heath Company, Benton Harbor, Mich.

[22] Filed: May 8, 1972

[21] Appl. No.: 250,921

[52] U.S. Cl. .................. 340/3 R, 324/187, 340/1 R, 340/3 E, 343/13 R
[51] Int. Cl. ........................... G01s 9/68, G04f 9/00
[58] Field of Search... 340/1 C, 1 R, 3 R; 343/5 DP, 343/7 A, 13 R; 324/186, 187

[56] References Cited
UNITED STATES PATENTS
3,500,189  3/1970  Gowan .......................... 324/187

FOREIGN PATENTS OR APPLICATIONS
1,212,016  11/1970  Great Britain ..................... 340/1

Primary Examiner—Richard A. Farley
Attorney, Agent, or Firm—Roylance, Abrams, Berdo & Kaul

[57] ABSTRACT

A depth sounder instrument having automatic range switching in which an oscillator and a divider produce timing pulse trains at two different frequencies which are related to the propagation velocity of the depth sounder transmitted pulse. A selected one of the pulse trains is delivered to a digital counter during the interval between the transmitted energy pulse and the received pulse, the latter having been reflected from the bottom of the body of water. The apparatus includes logic means responsive to the count arrived at during this interval to select the total instrument range for the next interval, this range being chosen by the selection of the pulse train. If the count accumulated during the interval is appropriate to the previously selected range, no change is made. However, if the count is either much smaller than, or greater than, the counter capacity, the other frequency is chosen, thereby causing the counters to accumulate at a faster or slower rate. The frequencies are preferably related by a power of 10 and a decimal point can then be illuminated or not, depending upon the range and frequency chosen.

5 Claims, 2 Drawing Figures

AUTOMATIC RANGE SWITCHING FOR DIGITAL DEPTH SOUNDERS This invention relates to digital depth sounders, and more specifically, to means for automatically switching the range of an instrument to display the results of digital depth sounding.

A depth sounder which is capable of measuring water depth in a range of interest up to, for example, about 200 feet presents the problem of measuring relatively large distances and relatively small distances and displaying them on the same basic display device which, in the case of a digital instrument, can be a standard illuminated electrode vacuum tube numerical display device or a light emitting diode display, or any other conventional display in which a series of digits can be selectively illuminated. Most frequently, a seven segment LED display is now chosen.

In order to provide a display of good accuracy and easy readability, it is desirable to be able to change the maximum reading, or "range" of the instrument, from a large to a small maximum capability.

However, it is not desirable to require the operator to remove his hands from control instruments or other tasks related to controlling a vessle in order to change the range of the instrument.

Accordingly, it is a primary object of this invention to provide a digital depth sounding instrument which displays the results of the depth sounding operation and which automatically switches to the most desirable range for the depth being measured.

It is a further object of this apparatus to provide a device which makes a range measurement, displays the results thereof, evaluates the relationship between the distance measured and the instrument range, and switches the range for the next measurement cycle if the selected range is not the most advantageous one available.

Briefly described, the apparatus described is usable with a reflected energy system of the type having means for transmitting an energy pulse, means for receiving a reflected pulse and means for controlling the timing of the transmission of pulses. The digital processing apparatus including the range switching includes means for generating trains of timing pulses at different first and second frequencies, means for selecting either the first frequency timing pulse train in response to a first selection signal or the second frequency timing pulse in response to a second selection signal, means for gating the selected one of the timing pulse frequency trains, the gating means being enabled by the transmitted energy pulse and disabled by the arrival of the received reflected pulse, means for counting the pulses in the selected pulse train during the interval between the transmitted and received pulses, means for generating the first and second selection signals, the first selection signal being generated when the count accumulated by the counting means exceeds a predetermined count during the interval and the second selection signal being generated when the count accumulated by the counting means is less than the same predetermined count, and means for displaying the total count accumulated by the counter means during the interval.

In order that the manner in which the foregoing and other objects are attained in accordance with the invention can be understood in detail, a particularly advantageous embodiment thereof will be described with reference to the accompanying drawings, which form a part of this specification, and wherein:

FIG. 1 is a block diagram of a digital depth sounder with circuits to provide automatic range switching. For ease of explanation, the principle functions of the automatic range switching depth sounder have been divided into three functional groups which are:

Figure 1:
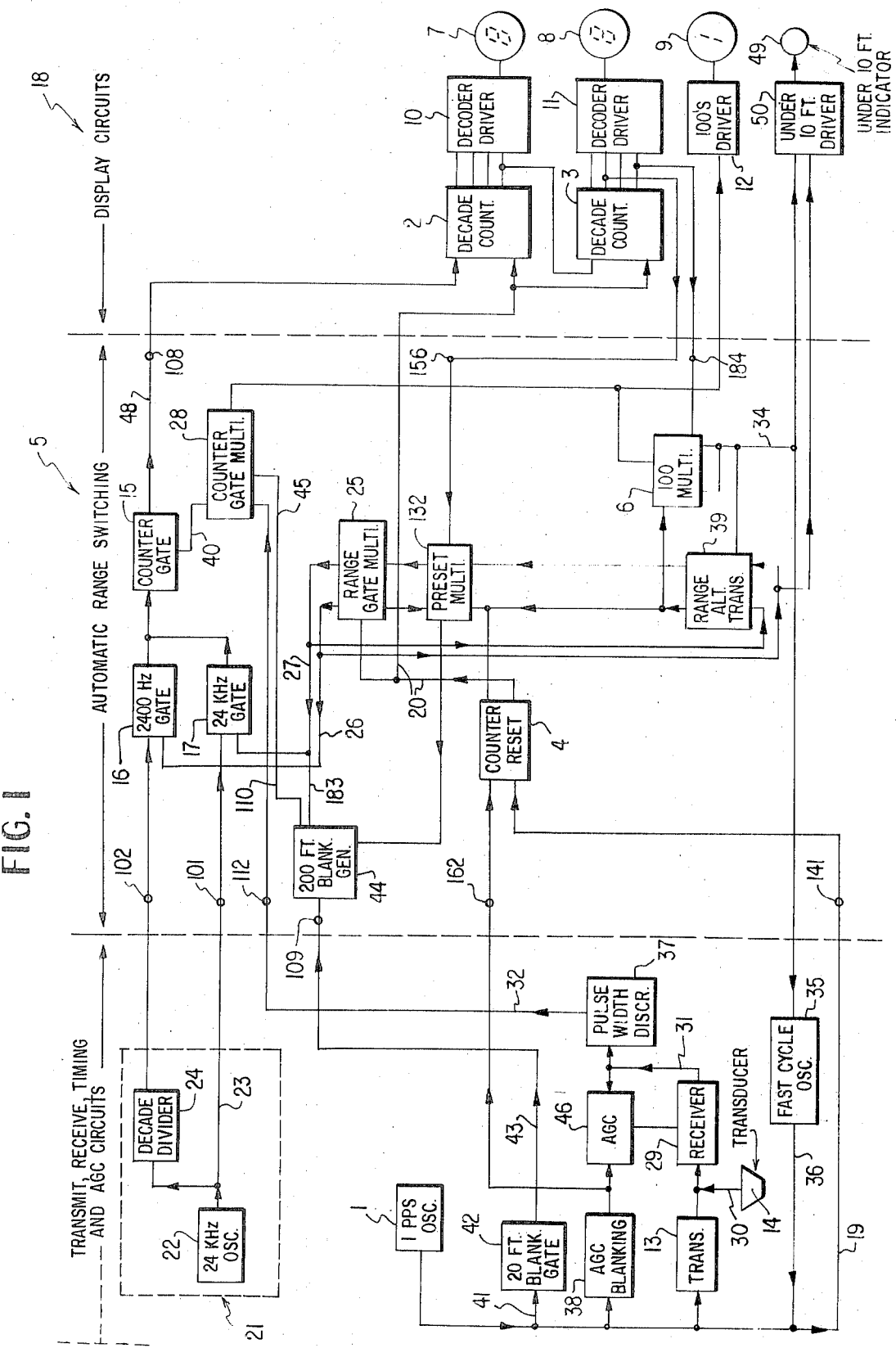
FIG. 1 is a schematic diagram, in block form, of a digital depth sounder apparatus in accordance with the present invention.

1. Transmit and receive circuits with associated timing and AGC elements.
2. Display circuits including counters, decoders, drives and displays.
3. Logic control circuits for automatic range switching.

Automatic range switching functions of the digital depth sounder are contained within the logic control group and are described in detail hereinafter. It will be realized that in order to clarify the drawings and simplify the explanation, certain details, such as voltage supplies, have been omitted but will be well known to those trained in the art of depth sounders and digital logic. The type of logic employed in the circuits described is generally referred to as TTL (transistor-transistor logic) although many other logic arrangements may be used to achieve the same desired results. In transistor-transistor logic the following rules usually apply and have been adhered to in all the FIGS. to be described herein. These rules are:

1. A logic 1 is defined as a voltage of plus 2.0 volts DC or higher, and is usually referred to as a logic high.
2. A logic 0 is defined as plus .8 volts DC or lower and may be referred to as a logic low.

The rules associated with the bi-stable multivibrators which are used for logic control but are not used in the decade counters are:

1. A logic 0 or logic low to the preset input sets Q to a logical 1.
2. A logic 0 or logic low to the clear input sets Q to a logical 0.
3. A logic signal at input D is transferred to the Q output on the positive going edge of the clock pulse.
4. Preset and clear are independent of the clock pulse.

The transistors employed in the circuits to be described are NPN type, and therefore positive supply voltages are used.

In this specification the word range is used exclusively to describe the mode of operation of the depth sounder. Thus, the statement "operating in the 20-foot range" means the depth sounder has a maximum display capability of 19.9 feet in the 20-foot mode of operation while the "200 range" means a display capability of 199 feet.

A signal from a repetition rate oscillator 1 which produces pulses at the rate of one pulse per second starts and synchronizes the basic functions of the digital depth sounder. A cycle of operation of the digital depth sounder, initiated by the "rep-rate" oscillator, starts by resetting two decade counters 2 and 3 to zero. A pulse from the rep rate oscillator 1 is applied to the reset terminals of decade counters 2 and 3 through path 19, the counter reset transistor 4 and path 20, causing the four binary stages of each counter to go to logic 0. At the same time, a signal from the logic control circuit shown generally as 5 will clear the hundreds multivibrator 6. Thus, at the beginning of each cycle of operation through the action of the repetition rate oscillator 1, the display devices 7, 8 and 9, which are coupled to counters 2, 3 and 6, through their respective drivers 10, 11 and 12, are initially set to display 0,9, 9. Counter gate 28 generates an additional pulse which resets the counters to 0, 0, 0. The exact details of the manner in which the multivibrator 6 is cleared will be described hereinafter.

A 200 kHz transmitter 13 is triggered by the rep rate oscillator 1 at substantially the same time that the displays 7, 8 and 9 are reset to 0. The transmitter 13 produces a short burst of 200 kHz energy which is applied to the transducer 14. At the same instant that an acoustic burst of energy is transmitted through the water by transducer 14, a counter gate 15 is opened by the counter gate multivibrator allowing pulses from either gate 16 or 17 to flow through the counter gate 15 to the counters and display circuits shown generally at 18.

The pulse time generator shown generally as 21 includes a pulse generator 22 which oscillates substantially at a frequency of 24 kHz. The output of pulse generator 22 is fed through conductor 23 to the 24 kHz gate 17. The output of the pulse generator 22 is also fed to the decade divider, or scale of 10, circuit 24. The output of the divider 24, which is fed to gate 16 is a continuous series of pulses at a frequency of 2,400 Hz, Gates 17 and 16 are enabled by the 20 and 200-foot range signals obtained from the range gate multivibrator 25 through the respective signal paths 26 and 27. Connecting the gates 16 and 17 to a single range gate multivibrator 25 ensures that one or the other of the gates will always be on and prevents them both from being on at one time. The details of the interconnections will be described hereinafter.

Counter gate 15 is controlled by signals via path 40 from counter gate multivibrator 28. The counter gate 15 is enabled by the timing signal from the 1 PPS oscillator 1 via path 41, the 20-foot blanking gate 42 via path 43, the 200-foot blanking generator 44 via path 45 and finally the counter gate multivibrator 28 to the counter gate 15 via path 40. The counter gate 15 is disabled by a signal received by the depth sounder transducer 14 and receiver 29. A reflected pulse of acoustic energy picked up by the transducer 14 and amplified by the 200 kHz receiver 29, resets the counter gate multivibrator 28 and disables counter gate 15. This signal is conducted from the transducer to the receiver through path 30, from the receiver to the pulse width discriminator 37 through path 31, through path 32 to the counter gate multivibrator 28 and finally through path 40 to the counter gate 15.

It will be obvious to those skilled in the art that the frequency of the pulse generator 22 has been chosen as substantially 24 kHz because of the velocity of acoustic energy in water, this velocity being substantially 4,800 feet per second. Thus during the time it takes a transmitted signal to travel from the transducer to the bottom of a body of water and be reflected back to the transducer, the pulse generator 22 has had time to generate 10 pulses for every foot of depth. While at the output of the decade divider 24, which has a frequency of 2.4 kHz, one pulse will be produced for every foot of depth.

In operation the circuits just described, which are part of the digital depth sounder, operate as follows. Upon initiation of a pulse from the rep-rate generator 1 the display circuits shown generally as 18 are reset to zero concurrently with the transmission of a pulse generated by the transmitter 13 and changed to acoustic energy by transducer 14. At this same time counter gate 15 is opened, i.e., enabled, permitting pulses, at the rate of 10 per foot of depth in the 20-foot range, or one per foot of depth in the 200-foot range, to flow to the counter stages 2, 3 and 6. Pulses from the counter gate 15 continue to flow to the counters until a reflected pulse is received by the receiver and employed to turn off the counter gate 15. Thus the counters will count the number of pulses received depending on the depth of the water, which will then be displayed on the display devices 7, 8 and 9.

Normally, the depth soundings are taken at a rate of 1 per second, a rate determined by the pulse repetition rate generator 1. In certain modes of operation, the automatic ranging features of the digital depth sounder would require additional time between sounding to complete the logic functions thus reducing the sounding rate. This is avoided by causing the overrange signal from the hundreds multivibrator counter 6 to immediately retrigger the repetition rate oscillator 1. This overrange signal from the hundreds multivibrator 6 is conducted via path 34 to the fast cycle circuit 35 and path 36 to retrigger the repetition rate oscillator 1. The digital depth sounder will continue in the fast cycle mode, operating at approximately 22 soundings per second, until a return echo signal is received. As will be described in further detail hereinafter in relation to the automatic ranging logic, the depth sounder alternates between the 20 and 200-foot depth ranges while in the fast cycle mode.

The gain of the depth sounder receiver is controlled by an RC time constant, an AGC circuit and an AGC blanking circuit. The amplitude of the received signals, which decrease as depth increases, is compensated for by adjusting the gain of the receiver with an RC time constant. This is effective in depths of less than 15 feet. At greater depths an AGC circuit 46 is employed to automatically control the receiver response. An AGC blanking circuit 38 is employed to disable the AGC circuits during the transmit pulses. This is done to prevent the receiver from becoming temporarily insensitive to receive signals as a result of the extremely large transmitted pulse which is applied to the common receive-transmit transducer. In effect, the AGC blanking circuit prevents the AGC circuit from developing an AGC voltage which would otherwise decrease the sensitivity of the receiver to near zero.

While in the fast cycle mode just described it is possible, under weak signal conditions, that a transmit pulse generated while in the 20-foot range condition would be detected as a received signal on the 200-foot range, and that an erroneous display on the 200-foot range might be produced. For example, a transmit pulse generated at the beginning of the 20-foot range might be displayed on a 200-foot range at a reading 20 feet less than the actual depth of water. Ambiguous readings caused by this combination of events is prevented first by making the transmit pulse on the 20-foot range shorter than the transmit pulse on the 200-foot range and secondly, by distinguishing between the corresponding long and short pulses when the return signal is received. Distinguishing between the two pulse lengths is accomplished by the pulse width discriminator 37. If a short pulse is received by the receiver 29 the pulse width discriminator 37 does not trigger the counter gate multivibrator 28 in the 200-foot range and therefore counter gate 15 is not opened and no count in the counter display shown generally as 18, takes place.

The counter, driver and display group shown generally as 18 is composed of conventional integrated circuits performing the functions of counting, decoding and driving which provide the signals for the seven-segment displays 7, 8 and 9. As described previously, a signal from the reset counter circuit 4 conducted via path 20 resets counters 1 and 2. Signals from the counter gate 15 on path 48 cause counter 2 to count at a calibrated rate of 10 pulses per foot of depth in the 20-foot range or one pulse per foot of depth in the 200-foot range. An overflow signal from counter 2 is used to activate counter 3 in a conventional manner. Thus, the two counters connected in series can count from one to 99 events. The overflow from counter 3 energizes the hundres multivibrator 6 which, in conjunction with the driver 12 and display 9 will indicate a zero if no overflow from counter 3 has been received, or a one if an overflow pulse from counter 3 has been received.

The output of both counters 2 and 3 is in the form of binary coded decimal signals which are transmitted directly to the decoder drivers 10 and 11. The decoder drivers perform the function of converting the BCD signals to seven-segment display signals and providing the voltage and current that is proper for operating the seven-segment displays 7 and 8.

The display lamp 49, which indicates depth of water less than 10 feet, is energized by the "less than 10-foot" driver 50. Logic signals, from the hundreds multivibrator 6 and the ranging logic shown generally as 5, are so chosen that the driver 50 conducts when the hundreds multivibrator 6 is in the zero display condition and the digital depth sounder is in the 20-foot range.

A decimal point indicator lamp and decimal point driver are employed to indicate that the digital depth sounder is in the 20-foot range when the indicator lamp is energized. The indicator lamp is between displays 7 and 8 located on the front panel of the depth sounder so that the display reads in tenths of feet when the light is energized. The decimal indicator and indicator driver are not shown on the block diagram.

AUTOMATIC RANGE SWITCHING CONTROL LOGIC

Figure 2:
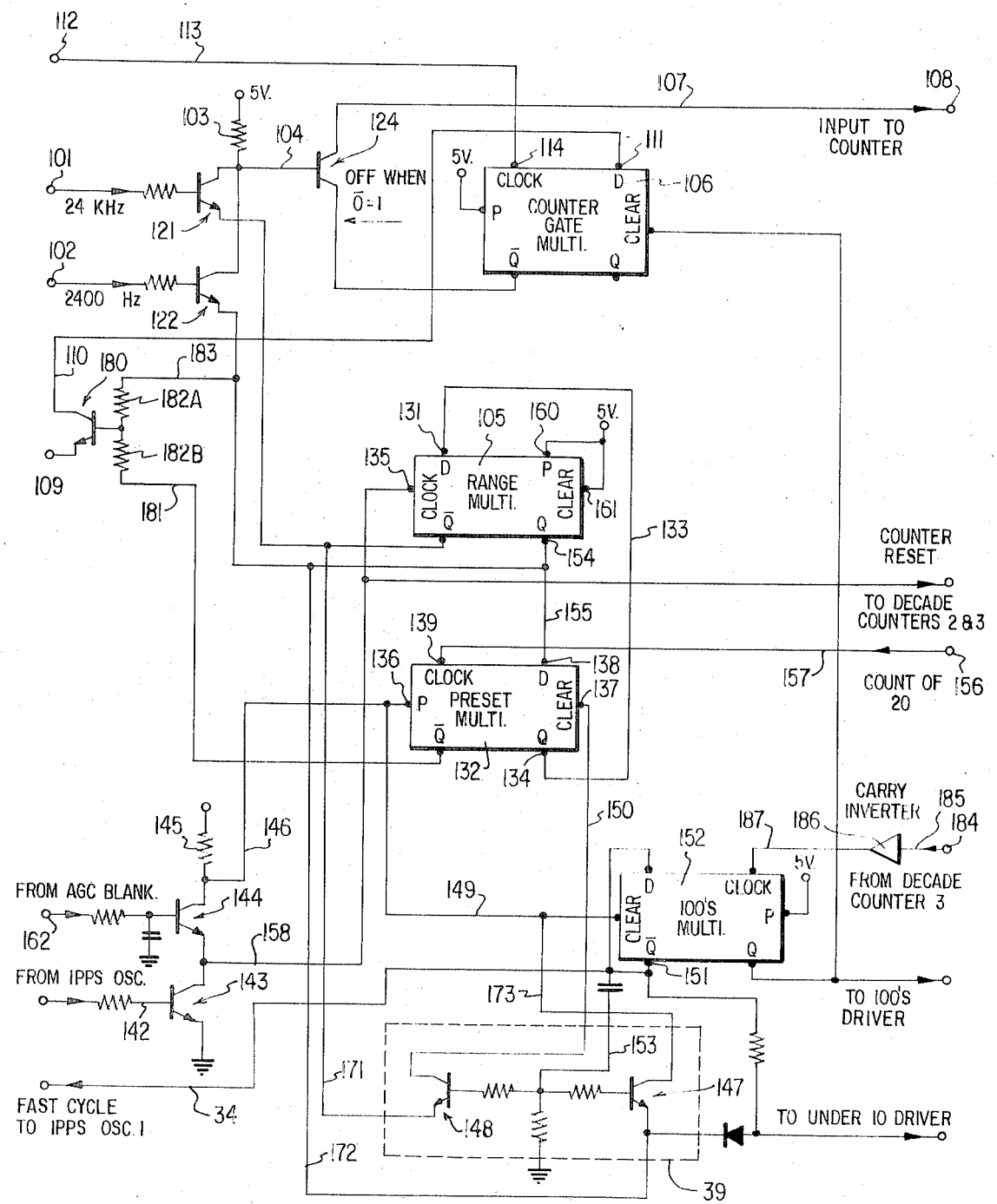
FIG. 2 is a schematic diagram, partially in block form, of the automatic range switching portion of the apparatus of FIG. 1.

FIG. 2 shows the details of the control logic for the automatic range switching features of the digital depth sounder. The logic elements which are shown generally as 5 in FIG. 1 are shown in detail in FIG. 2. Pulses from the pulse time generator 21 as shown in FIG. 1, are applied to terminals 101 and 102 at a frequency of 24 kHz and 2,400 Hz respectively. It will be noted that the pulses from terminals 101 and 102 are applied to the bases of transistors shown generally as 121 and 122, respectively.

For convenience, the input and output terminals of FIG. 2 are also shown in FIG. 1. A common load resistor 103 is connected between the junction of the collectors of transistor 121 and 122 and the 5-volt collector supply. The signals developed across the common collector resistor 103, caused by the conduction of transistors 121 or 122, are applied to transistor 124 through path 104. Transistors 121 and 122 perform as gates under the control of the range multivibrator which is shown as 25 in FIG. 1. The emitter of transistor 122 is connected to the Q output of the range multivibrator 105 while the emitter of transistor 121 is connected to the Q̄ output of the range multivibrator. Thus, when the range multivibrator 105 is in a state such that Q is at a logical zero, the emitter of transistor 122 is held near ground potential and therefore will conduct when pulses at a frequency of 2,400 Hz are applied to the base and will in turn produce amplified pulses at the collector and common load resistor 103. Transistor 121 performs in a similar way when the Q output of the range multivibrator 105 is at a logical zero. Since in normal operation a multivibrator can only have one of its output terminals at a logic zero at any one time, it therefore follows that only transistor 121 or 122 can be conducting at one time.

The timing pulses which are gated by transistors 121 or 122 and developed across load resistors 103 are applied to the base of transistor 124 through path 104. Transistor 124 also acts as a gate under the control of the counter gate multivibrator 106. When the output at the counter gate multivibrator terminal Q̄ is at logic zero the transistor shown generally at 124 conducts and the counter pulses are transmitted to the digital counters through path 107 and terminal 108.

As described previously, the counter gate multivibrator 106 is turned on when a signal is transmitted by the depth sounder and turned off when a signal is received by the depth sounder. A negative pulse from the rep rate generator 1, shown in FIG. 1, which is processed by the 20-foot blanking gate which is not shown in FIG. 2 is applied to terminal 109 to the 200 foot blanking gate transistor 180 through the path 110 to the D input 111 of the countergate multivibrator. As stated in the logic, rules, however, the application of a logic 1 pulse to the D input of the multivibrator does not cause it to change state until a positive going signal is received at the clock input terminal 114 of the multivibrator. The clock signal which is generated by the rep rate oscillator 1 and processed by the pulse width discriminator 37 as shown in FIG. 1 is applied to terminal 112 and transmitted via path 113 to the clock input 114 of the counter gate multivibrator. Upon receipt of this clock signal, the multivibrator immediately changes state, terminal Q becoming a logic zero and allows transistor 124 to conduct pulses from either transistor 121 or 122 to be applied to the digital counters through path 107 and terminal 108. This combination of pulses at the clock input terminal and the D terminal 111 of the counter gate multivibrator is provided in order to prevent undesired pulses from the transducer from accidentally turning off the counter gate multivibrator.

At some later time, determined by the blanking circuit not shown in FIG. 2, the logic 1 applied to the D input 111 of the counter gate multivibrator, returns to a logic zero and a received pulse, which is also applied to terminal 112, is applied to clock terminal 114 via path 113 and turns off the counter gate multivibrator 106 thereby terminating the counting of the digital counters.

Prior to a detailed description of the operation and timing of the various logic elements that make up the automatic ranging features of the depth sounder, the description of the function of each logic element and a description of the source and use of each signal is provided.

First, the range multivibrator 105 determines the range of the depth sounder by turning on the appropriate 24 kHz or 2,400 Hz signals through the action of the transistor gates 121 and 122. The state of the range multivibrator 105 is determined exclusively by the signal applied to the D input 131 which is obtained from the Q output 134 of the preset multivibrator 132 via path 133. Thus, if the signal at the Q terminal 134 of the preset multivibrator 132 is a logic zero, the range multivibrator 105 will be set to the 200 foot range while if the logic level at the Q terminal 134 of the preset multivibrator 132 is a logic 1, the range multivibrator 105 will be set to the 20-foot range. It is important to note, however, that the range multivibrator 105 does not immediately switch to the range dictated by the logic level applied to the D terminal 131. As stated previously in the logic rules, the multivibrator will only change state when a positive going clock signal is applied to the clock terminal 135. Note also that the clear and preset terminals 160 and 161, respectively, of the range multivibrator 105 are connected to the 5-volt DC supply voltage, and therefore do not enter into any of these state changing operations.

The basic function of the preset multivibrator 132 is to control the state of the range multivibrator 105. This is accomplished by connecting the Q terminal 134 of the preset multivibrator to the D input 131 of the range multivibrator 105 via path 133. By this connection, the range multivibrator will follow the state of the preset multivibrator noting, however, that the range multivibrator takes on the state assigned by the preset multivibrator only at the instant a clock pulse is applied to the clock terminal 135 of the range multivibrator 105.

The preset multivibrator 132 changes state in response to signals applied to the P input terminal 136, the clear terminal 137 and the D input 138. While the preset multivibrator controls the state of the range multivibrator, under certain conditions the range multivibrator acts as a memory for the preset multivibrator. Thus, the connection of the Q output terminal 154 of the range multivibrator 105 to the D input 138 of the preset multivibrator 132 via path 155, permits the preset multivibrator 132 to take on the state held in memory by the range multivibrator. Again, the preset multivibrator can only respond to signals at the D terminal 138 when a clock pulse is received at the clock terminal 139.

Initially, the preset multivibrator 132 is set to the 20-foot range by a signal received from the AGC blanking circuit 38 and applied to terminal 162 to transistor 144 which is in series with transistor 143. The signal is extracted from the transistor pair 143 and 144 via the collector load resistor 145. The signal from the rep rate oscillator is developed across the common load resistor 145 and is applied via path 146 to the preset terminal P 136 of the multivibrator 132, thus presetting it to the 20-foot range. The object and details of the operation of the transistors 143 and 144 will be described in further detail hereinafter.

The state of the preset multivibrator 132 is also changed by signals applied to the preset input 136 and the clear input 137 by signals obtained from transistors 147 and 148 through paths 149 and 150, respectively. The range alternating transistors shown generally as 147 and 148 in FIG. 2 and as block 39 in FIG. 1, are activated by an overrange signal obtained from the $\overline{Q}$ terminal 151 of the hundreds multivibrator 152 through path 153. Thus, in an overrange condition the range alternating transistors 147 and 148 will cause the preset multivibrator 132 to go into the 20-foot range during one sounding cycle and to the 200-foot range in a second or alternate sounding cycle. As described before, upon application of a clock signal to terminal 135 of the range multivibrator 105, the range settings of the preset multivibrator 132 will be transferred to the range multivibrator through path 133.

The range preset multivibrator 132 will perform in one additional mode of operation, i.e., the range multivibrator will act as a memory device for the range state contained in the preset multivibrator 132 during one cycle of operation. The range state of the range multivibrator 105, i.e., a logic 1 for 20 feet and a logic 0 for 200 feet, is provided at the Q terminal 154, of multivibrator 105, and transferred via path 155 to the D input terminal 138 of the preset multivibrator 132. Thus, upon receipt of a count of 20 signal at terminal 156, which is applied to the clock terminal 139 via path 157, the preset multivibrator 132 will take on the state presently registered in the range multivibrator 105.

Before proceeding with a description of the operation of the control logic it is important to describe the interrelation of the timing of the range and preset multivibrators as well as the function of the timing transistors shown generally as 143 and 144. First, the range multivibrator 105 controls the range of the depth sounder by controlling the operation of the range gates 121 and 122 and it is therefore important that the multivibrator does not change range during a sounding operation and further that it changes state only when the digital displays 7, 8 and 9 of FIG. 1, register zero. For this purpose the signal from the rep rate oscillator 1 applied to terminal 141 and through path 142 to transistor 143 and then through path 158 is applied to the clock input 135 of the range multivibrator at the start of each sounding cycle. Proper operation of the automatic ranging logic also requires that the preset multivibrator 132 be preset to the 20-foot range at the beginning of each sounding cycle. However, since the range state of the preset multivibrator as determined from the previous cycle of ranging operation, determines the range state of the range multivibrator for the following cycle of operation, it is important that the preset multivibrator not be reset to the 20-foot range until range state has been transferred to the range multivibrator 105 by the application of the clock pulse to terminal 135. For this purpose an AGC blanking signal from the AGC blanking circuit 38 (FIG. 1) applied to terminal 162 in conjunction with transistor 144 delays the preset signal applied to terminal P 136 of the preset multivibrator, which resets it to the 20-foot range, until completion of the counter reset pulse on path 158 which is applied to the clock terminal of the range multivibrator. In brief, this process insures that the range state of the preset multivibrator 132 is transferred to the range multivibrator 105 before the preset multivibrator is reset to the 20-foot range.

In the description of the operation conditions of the automatic range switching circuits of the digital depth sounder which follow, there are four possible combinations of range and depth for the logic to handle. The four combinations are divided into the two major divisions, i.e., (1) the depth sounder is operating in the correct range condition, and (2) the depth sounder is operating in the incorrect range condition. The two subdivisions, when the depth sounder is in the correct range mode are: (1A) the depth sounder is operating in the 20-foot range, the water depth is less than 20 feet and therefore the depth sounder should remain in the 20-foot range; and (1B) the depth sounder is operating in the 200-foot range, the depth of water is over 20 feet and therefore the depth sounder should remain in the 200-foot range.

The second major subdivision is when the depth sounder is operating in its incorrect range mode. The first subdivision (2a) is: the depth sounder is operating in the 20-foot range but the depth of water is greater than 20 feet and therefore the depth sounder should be under the 200-foot range, and (2a) the second subdivision in this mode of operation is that the depth sounder is operating on the 200-foot range and the depth of water is less than 20 feet and therefore the depth sounder should be in the 20-foot mode.

These subdivisions may be described in tabular form as shown in the Table I below.

TABLE I.—DEPTH SOUNDER OPERATING MODES

|  | Depth sounder operating in the correct range | | Depth sounder operating in the incorrect range | |
| --- | --- | --- | --- | --- |
|  | A | B | C | D |
| The depth of water is (ft.) | <20 | >20 | >20 | <20 |
| The range of the depth sounder is (ft.) | 20 | 200 | 20 | 200 |
| The range of the depth sounder should be (ft.) | 20 | 200 | 200 | 20 |

Table II is useful in describing the logic and showing the relationship of the range of the depth sounder, the depth of water and the condition of both the range and preset multivibrators. Column 1 shows the condition of the depth sounder, i.e., under condition A the depth sounder is in the 20 foot range condition and the depth of water is assumed to be less than 20 feet. Column 2 shows the condition of both the range and preset multivibrators during the previous sounding period. Both the range and preset multivibrators were in the 20-foot state, i.e., the logic signals as read at the Q terminals 154 and 134 of the range multivibrator 105 and the preset multivibrator 132 respectively were both at logic one's equivalent to the 20-foot range. Column 3 of Table II shows the change of states that would take place in either the range or preset multivibrators during the time interval $T_0$. $T_0$ is defined as the time when the reset pulse is applied to the display counters resetting them to 0 and is also defined as the time when the reset pulse on path 158 is used to clock terminal 135 of the range multivibrator 105, thus transferring whatever state exists as the Q terminal 134 of the preset multivibrator to the D terminal 131 of the range multivibrator. As shown in condition A of Table II, both the range multivibrator and preset multivibrator are already in the 20-foot state during the previous period and remain in this state in time interval $T_0$.

Column 4 of Table II shows the state of the preset multivibrator after the application of the reset pulse via path 146 to P terminal 136 of the preset multivibrator 132. It will be remembered that the reset pulse on path 146 is intentionally delayed from the reset pulse on path 158 so that the range state data contained in the preset multivibrator may be transferred to the range multivibrator prior to resetting the preset multivibrator. It will be noticed by glancing down the length of column 4 that the reset pulse on path 146 resets the preset multivibrator during the time interval $T_1$ to the 20-foot state regardless of its state during the previous time period $T_0$. In the case of condition A with depth sounder in the 20-foot range and the depth less than 20 feet, both the range and preset multivibrators will remain in the 20-foot states throughout the rest of this period and no changes in states are required as long as the depth of the water remains less than 20 feet.

Under condition B as shown in column 1 of Table II, where the depth sounder is considered to be on the 200 foot range from the previous cycle, and the depth of water is greater than 20 feet, it will be noticed in columns 2 and 3, that both the range and preset multivibrators will be in the 200 foot state, i.e., the Q terminals will be set to a logic zero. The delayed reset pulse on path 146 will set the preset multivibrator to the 20 foot state. Note, however, that no change takes place in the range multivibrator during period $T_1$. Column 5 under condition B, indicates that the preset multivibrator changes from the 20 foot state to the 200 foot state. This action is caused by the count of 20 signals, which is obtained from the display counters and applied to the terminal 156 via path 157 to the clock terminal 130 of the preset multivibrator. According to the logic rules, as previously described, the application of a signal to the clock terminal 139, will cause the logic state at the D terminal 138 to be transferred to the Q terminal 134. In this particular case, the signal at the D terminal 138 is obtained from the Q terminal 154 of the range multivibrator 105. This state, as indicated by the timing of Table II, shows that the state at terminal Q of the range multivibrator is a logic zero equivalent to the 200 foot range. Thus, by action of the count of 20 signal applied to terminal 156, the preset multivibrator will change from the 20 foot state as shown on column 4 to the 200 foot state as shown in column 5. During the rest of this depth sounder cycle, the preset and range multivibrators will remain in the same state. The following cycle of operation will be identical to the cycle just described.

| 1 | 2 | 3 | 4 | 5 | 6 | 7 |
| --- | --- | --- | --- | --- | --- | --- |
| Condition of depth sounder | Previous period | $T_0$ | $T_1$ | Count of 20 | Count of 200 | End of period |
| A (Range 20', depth <20'): | | | | | | |
| Range FF | 20 | 20 | | | | 20 |
| Preset FF | 20 | 20 | 20 | | | 20 |
| B (Range 200', depth >20'): | | | | | | |
| Range FF | 200 | 200 | | | | 200 |
| Preset FF | 200 | 200 | 20 | 200 | | 200 |
| C₁ (Range 20', depth >20'): | | | | | | |
| Range FF | 20 | 20 | | | | |
| Preset FF | 20 | 20 | 20 | 20 | Or 200 | 20 |
| C₂: | | | | | | |
| Range FF | 20 | 200 | | | | 200 |
| Preset FF | 200 | 200 | 20 | 200 | | 200 |
| D₁ (Range 200', depth <20'): | | | | | | |
| Preset FF | 200 | 200 | | | | 200 |
| Range FF | 200 | 200 | 20 | 200 | Or 20 | 20 |
| D₂: | | | | | | |
| Range FF | 200 | 20 | | | | 20 |
| Preset FF | 20 | 20 | 20 | | | 20 |

Several rules of logic operation may be inferred by observing the operation of the range and preset multivibrator during the two previously described modes of operation of the depth sounder. These rules apply to all modes, not just to modes A and B. First, it will be noticed that the range multivibrator only changes state during the $T_0$ time interval. Second, when a count of 20 or a count of 200 overrange signal indicates that a change in the state of the range multivibrator is required, this information is held in memory by the preset multivibrator until the $T_0$ time period at which time the information is transferred to the range multivibrator. It will also be noted that when a count of 20 signal is received by the logic from the counters, it is necessary that the preset multivibrator acts in accordance with the state of the range multivibrator, the state being transferred by the application of the clock signal as previously described. It will further be noted that it is the count of 20 or the count of 200 overrange signal that sets the preset multivibrator to the correct range, if it is not already in that condition.

Returning now to column 1 of Table II where the depth sounder is in the 20 foot range with the depth of water greater than 20 feet. It will be noticed in the first four time periods, as shown in columns 2, 3, 4 and 5, that both the range and preset multivibrators are in and remain in the 20 foot state. Since the range is set to 20 feet, however, the counters will quickly reach the count of 200 (note that the counters are counting pulses representing tenths of feet) and therefore a positive pulse is generated at the $\bar{Q}$ terminal 151 of the hundreds multivibrator 152. As previously described, the positive pulse will be applied through path 153 to the range alternating transistors 147 and 148, a process which will reverse the range state of the range multivibrator 105.

The process of reversing the state of the range multivibrator 105 in response to an overrange signal, generated at terminal 151 of the hundreds multivibrator 152, is described in detail by the following logic operations:

— The positive overrange signal, which is equivalent to logic 1, is applied to the base of transistor 148 and causes the transistor to conduct when a negative or logic zero is applied to the emitter of the same transistor. The negative signal or logic zero which is applied to the emitter of transistor 148 is obtained from the $\bar{Q}$ terminal when the range multivibrator is in the 20 foot state.

— When transistor 148 conducts the collector goes low and produces a logic zero which is applied via path 150 to the clear terminal 137 of the preset multivibrator 132. The application of a negative or logic zero to the clear terminal of the preset multivibrator sets the Q terminal 134 to a logic zero which is applied through path 133 to the D terminal 131 of the range multivibrator 105.

— Application of the negative or logic zero to the D terminal 131 of the range multivibrator 105 sets the Q terminal 154 to a logic zero (200-foot range). As previously described this process of changing state only takes place, in regard to signals applied to the D terminal, when a clock signal is applied to the clock terminal.

— The process just described causes a reversal of the state of both the preset and range multivibrators on receipt of an overrange signal. It will be recognized by those familiar with digital logic that the process may be reversed. That is, if an overrange signal is received while the range multivibrator is in the 200 foot range, transistor 147 will conduct, transmitting a pulse through path 173 to the preset terminal 136 of the preset multivibrator, which will result in the range multivibrator changing from the 200 foot to the 20 foot state by a process similar to the one just described.

Referring again to Table II, it will be noticed that condition C of the depth sounder wherein the depth sounder is set to 20 feet and the depth of water is greater than 20 feet, while in condition D the depth sounder is set to 200 feet while the depth of water is less than 20 feet; and therefore these two conditions complement each other to the extent that both of them require the reversal of the range setting by the automatic range setting features of the range setting digital depth sounder. It will also be noticed that in both conditions $C_1$ and $D_1$ that the overrange signal causes the reversal of the state of the preset multivibrator which in turn results in the reversal of the states of the range multivibrator. Conditions $C_2$ and $D_2$ in the same table are supplied for convenience to show the operation of the two multivibrators in the next or following cycles of operation.

The previous logic description has shown how an overrange signal on the 20 foot range will automatically switch the depth sounder to the 200 foot range. The logic circuit which reverses the process, i.e., switches from the 200 foot to the 20 foot range in response to an overrange logic signal, has also been described. However, it is obvious that with the counter circuit so far described, no overrange signal will be produced with the depth sounder in the 200 foot range and the depth of water less than 20 feet, although the sounder should be in the 20-foot range. The logic steps required to provide the overrange signal, in the above stated conditions are described below.

As described in relationship to the counter gate multivibrator 106 a positive pulse received on terminal 109 and conducted path 110 to the D terminal 11 of the multivibrator is used in conjunction with other signals to turn the counter gate on and initiate the start of the counting process. If, however, transistor shown generally as 180 is held cutoff, then the signal on path 110 will remain a logic 1 and prevent the counter gate multivibrator 106 from being turned off. Thus, although a signal may be received at terminal 112 and transmitted via path 113 to terminal 114 of the counter gate multivibrator, the gate cannot be turned off because the signal at the gate terminal D 111 remains a logic one, Under these conditions, the counters will continue to count until an over-range signal is produced which will cause the depth sounder to change from the 200 foot range to the 20 foot range when the depth of water is less than 20 feet. The logic signal which will cause transistor 180 to be cutoff during the proper time interval is the Q from the preset multivibrator 132 which is applied to transistor 180 through path 181 and 182B. This signal at the Q terminal is a logic zero when the depth sounder is in the 200 foot range and the count is less than 20 feet. A logic 0 applied to the base of the transistor 180 will cause the transistor to be cut off. However, with this arrangement $\bar{Q}$ will also be a logic zero during the 20 foot range and a received pulse applied to the clock terminal of the counter gate multivibrator would not stop the counter, as it should, with the depth sounder in the 20 foot range. In order to prevent this, the base of the transistor 180 is also returned to the Q signal terminal 154 of the range multivibrator 105 through resistor 182A and path 183. Thus, the combination of the transistor 180, resistor network 182, the Q signal from the range multivibrator and the $\bar{Q}$ signal from the preset multivibrator will provide the proper logic signal at the D terminal 111. The counter gate multivibrator 106 produces an overrange count causing the depth sounder to switch from the 200 foot to the 20 foot range in depths of water less than 20 feet.

In conjunction with the discussion of the operation of the hundreds multivibrator 152, it will be noted that the carry signal from the second decade counter 3 of FIG. 1 is applied to the clock terminal 188 via terminal 184, path 185, carry inverter 186 and path 187 as shown in FIG. 2.

The digital depth sounder just described with automatic range switching has a 20 foot range and a 200 foot range calibrated in tenths of feet and hundredths of feet, respectively. Other ranges and other calibrations such as feet and fathom could be employed with minor changes in the oscillators and logic circuitry.

While one advantageous embodiment has been described in detail, it will be recognized by those skilled in the art that various modifications can be made therein without departing from the invention as defined by the appended claims.

What is claimed is:

1. An automatic range switching apparatus for use in a distance measuring system of the type having means for transmitting an energy pulse, means for receiving a reflected pulse and means for timing the transmission of pulses, the apparatus comprising the combination of means for generating trains of timing pulses at different first and second frequencies;
   means for producing one of a first selection signal when in a first state and a second selection signal when in a second state;
   means for selecting a train of timing pulses at one of said first and second frequencies in response to one of said first and second selection signals, respectively;
   means for gating the selected train of timing signals, said gating means being enabled by the transmitted pulses and disabled by the received pulses;
   means for counting the selected train of pulses during said interval between the transmitted pulses and received pulses, said counter having a predetermined capacity;
   means for producing an inhibit pulse when both the count accumulated in said counter is less than a first predetermined total and when said means for producing a selection signal is in a second state;
   means connected to said means for producing an inhibit pulse for inhibiting the received pulses; means for displaying the count accumulated by said means for counting;
   said means for producing one of said selection signals changing from the first state to the second state when the count accumulated by said means for counting exceeds said predetermined capacity during said interval, and to change from the second state to the first state when both said means for producing one of said selection signals is in the second state and said means for counting exceeds predetermined total during said interval.

2. An apparatus according to claim 1 wherein the means for producing said first and second selection signals comprises a bistable multivibrator in which the first stable state of said bistable multivibrator generates the first selection signal and second bistable state of said bistable multivibrator generates the second selection signal.

3. An apparatus according to claim 1 wherein the means for generating said first and second frequency timing pulses comprises a fixed frequency pulse oscillator and a decade counter.

4. An apparatus according to claim 3 wherein said fixed frequency pulse oscillator generates pulses at substantially 24 kHz.

5. In a system for measuring the duration of a varying time interval by counting the number of pulses of known frequency during the time interval, the system being of a type including a repetition rate oscillator for initiating a measurement cycle repetitively, an apparatus comprising;

oscillator means for generating timing pulses;
   means for counting said timing pulses;
   means for displaying the count accumulated by said means for counting during the time interval, said means for displaying having a limited number of displayable digits;
   means for changing the frequency of said oscillator means in discreet steps, said means for changing the frequency being responsive to said means for counting to decrease the frequency of said oscillator means when the count accumulated by said means for counting exceeds a predetermined count and to increase said oscillator frequency when the count accumulated by said means for counting is less than a predetermined count, whereby the measuring system maintains the resolution ratio within preselected limits, said resolution ratio being defined as the ratio of the measured time interval to the number of displayed digits; and
   means responsive to said means for changing the frequency for immediately retriggering the repetition rate oscillator to initiate a next measurement cycle substantially at the completion of the time interval.

* * * * *